No. 632,965. Patented Sept. 12, 1899.
S. JENSEN & J. COMAR.
LOOM CLOTH MEASURER.
(Application filed Feb. 2, 1899.)
(No Model.)
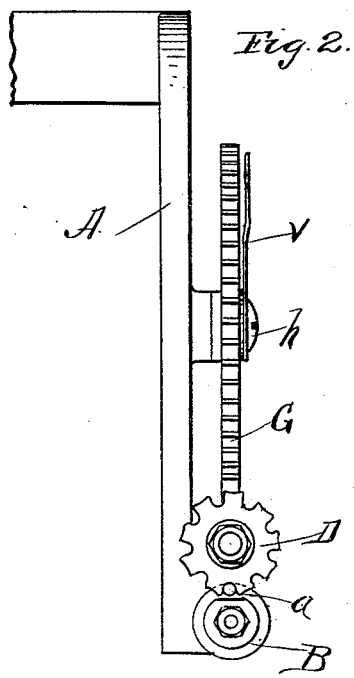
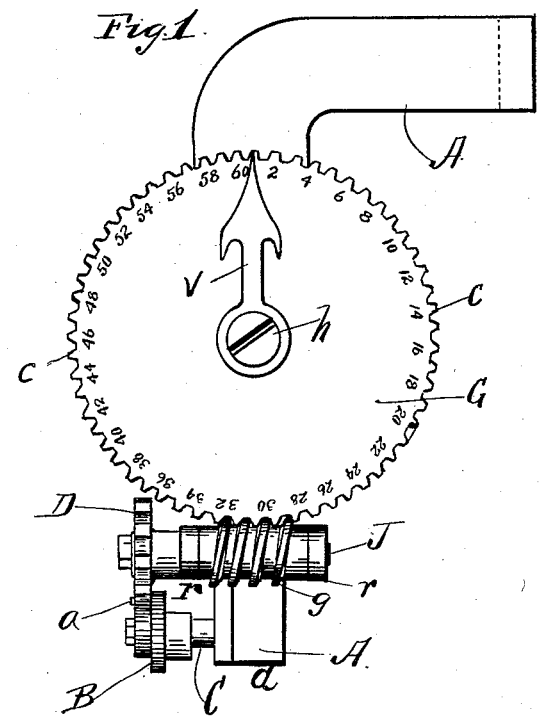
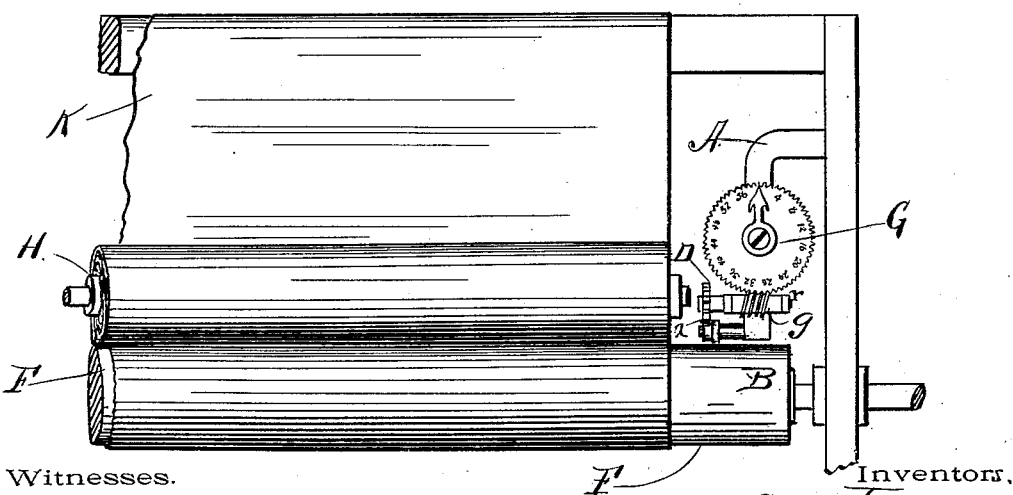
Witnesses.
M. E. Cleveland
John P. Smith
Inventors,
Soren Jensen
John Comar.
by
Arnold Barlow
Attorneys
THE NORRIS PETERS CO., PHOTO-LITHO., WASHINGTON, D. C.

UNITED STATES PATENT OFFICE.

SOREN JENSEN AND JOHN COMAR, OF PROVIDENCE, RHODE ISLAND.

LOOM CLOTH-MEASURER.

SPECIFICATION forming part of Letters Patent No. 632,965, dated September 12, 1899.

Application filed February 2, 1899. Serial No. 704,222. (No model.)

*To all whom it may concern:*

Be it known that we, SOREN JENSEN and JOHN COMAR, of Providence, in the county of Providence and State of Rhode Island, have invented certain new and useful Improvements in Loom Cloth-Measurers; and we do hereby declare that the following is a full, clear, and exact description thereof, reference being had to the accompanying drawings, and to the letters of reference marked thereon, which form a part of this specification.

This invention relates to that class of devices made for the purpose of measuring the cloth in a loom as fast as it is woven and plainly indicating the measure to the operative as the work progresses.

The object of the invention is to furnish a device by which the weaver can see at any time how fast his work is progressing and also enable him for his own satisfaction to verify the final measure of the cloth in the cloth-room, upon which the amount of his pay depends.

It is fully explained and illustrated in this specification and the accompanying drawings.

Figure 1 shows a front elevation of the mechanism of the measuring device. Fig. 2 is a side elevation of the mechanism shown in Fig. 1. Fig. 3 represents in elevation the front of a loom with the measuring mechanism and the parts of the loom connected with it.

In Fig. 2, A indicates a bracket that is attached to the loom-frame at its upper end by a bolt. At the lower end of the bracket A a short horizontal shaft C is held in a bearing $d$, and a friction-wheel B is made fast in the inner end of the shaft C, with a pin $a$ inserted in the side of the wheel B. (See Fig. 1.) Another shaft J is held in bearings a little higher up on the bracket A than the shaft C, and a toothed wheel D, fast on the inner end of the shaft J, is so held that the pin $a$ in the wheel B will at each revolution of that wheel catch one of the teeth of wheel D and turn the shaft J a little ways. The shaft J has a worm $g$ fast on it between its bearings $r\ r$ on the bracket A, which worm engages with the teeth $c$ of a dial-wheel G, held to turn on a stud $h$, fast in the bracket A. The dial-wheel G has a series of numerals on its face near the edge counting, preferably, up to "60." A hand or pointer V is held fast on the stud $h$ in position to indicate the figures as the dial is moved.

The operation of the measure is this, when the sand-roll F is turned to wind the cloth K on the cloth-roll H the friction-wheel B, resting on it, will be turned, and at each revolution the pin $a$ in the side of the wheel B will enter between two of the teeth of the wheel D and will move that wheel one tooth. When the wheel D has made a full turn, the worm $g$ will have moved the dial-wheel one tooth or one figure on the dial, which will be indicated by the pointer V. The relative sizes of the sand-roll F and wheels B D G may be varied, if desired, but the following is a convenient proportion: If the sand-roll F is one foot in circumference and the friction-wheel B one-third of that and has nine teeth, each tooth on the wheel G will indicate one yard of cloth, which will be shown on the dial, or if the friction-wheel B is one-twelfth of a yard in circumference the wheel D should have twelve teeth.

Having thus described our improvements, we claim as our invention and desire to secure by Letters Patent—

In a cloth-measurer, the sand-roll, having its ends to project under the measuring mechanism, the cloth-roll of less length than the sand-roll; and a bracket, combined with a horizontal shaft C extending in a line with the sand-roll and provided with a friction-wheel B which is operated by the sand-roll, and a pin $a$, the short shaft J also placed in a line with the sand-roll and which is provided with a toothed wheel at one end, and which is operated by the pin $a$, the worm $g$, secured to the shaft J, the toothed wheel G operated by the worm, and a pointer; the three shafts B, C, J being placed one above the other in a line with each other and arranged to operate substantially as shown and described.

In testimony whereof we have hereunto set our hands this 28th day of January, A. D. 1899.

SOREN JENSEN.
JOHN COMAR.

In presence of—
BENJ. ARNOLD,
W. E. CLEVELAND.